(12) United States Patent
Takahashi

(10) Patent No.: US 8,232,004 B2
(45) Date of Patent: Jul. 31, 2012

(54) POWER STORAGE DEVICE, AND METHOD FOR MANUFACTURING POWER STORAGE DEVICE

(75) Inventor: Izumi Takahashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 701 days.

(21) Appl. No.: 12/377,963

(22) PCT Filed: Aug. 23, 2007

(86) PCT No.: PCT/IB2007/002425
§ 371 (c)(1),
(2), (4) Date: Feb. 18, 2009

(87) PCT Pub. No.: WO2008/023255
PCT Pub. Date: Feb. 28, 2008

(65) Prior Publication Data
US 2010/0035151 A1  Feb. 11, 2010

(30) Foreign Application Priority Data
Aug. 25, 2006 (JP) ................ 2006-229357

(51) Int. Cl.
*H01M 4/02* (2006.01)
*H01M 4/08* (2006.01)
*H01M 2/02* (2006.01)
*H01M 6/08* (2006.01)
*H01M 2/08* (2006.01)
*H01M 10/16* (2006.01)

(52) U.S. Cl. ........ 429/211; 429/164; 429/181; 429/184; 429/208

(58) Field of Classification Search ............. 429/208, 429/211, 164, 181, 184
See application file for complete search history.

(56) References Cited

U.S. PATENT DOCUMENTS

| | | | |
|---|---|---|---|
| 3,456,313 A | | 7/1969 | Rodriguez at al. |
| 4,283,470 A | * | 8/1981 | Freeman et al. ............... 429/209 |
| 4,324,845 A | * | 4/1982 | Stockel ........................ 429/101 |
| 4,734,341 A | * | 3/1988 | Descroix et al. ............... 429/62 |
| 4,830,936 A | | 5/1989 | Planchat et al. |
| 5,047,301 A | | 9/1991 | Adlhart et al. |
| 5,501,916 A | * | 3/1996 | Teramoto et al. .............. 429/94 |
| 6,139,987 A | | 10/2000 | Koo et al. |

FOREIGN PATENT DOCUMENTS

| | | |
|---|---|---|
| EP | 0 414 337 A2 | 2/1991 |
| GB | 1 316 516 A | 5/1973 |
| GB | 2 046 018 A | 11/1980 |
| JP | 09-259860 A | 10/1997 |
| JP | 11-260325 A | 9/1999 |
| JP | 2001-102050 A | 4/2001 |

* cited by examiner

*Primary Examiner* — Patrick Joseph Ryan
*Assistant Examiner* — Julian Anthony
(74) *Attorney, Agent, or Firm* — Kenyon & Kenyon LLP

(57) ABSTRACT

A power storage device has a stack including positive electrodes and negative electrodes that are stacked on top of each other with electrolytes interposed in-between. A positioning member is inserted into a positioning hole that is formed in the stack so as to penetrate the stack in the stacking direction. A terminal portion is formed at an end of the positioning member in the inserting direction.

23 Claims, 4 Drawing Sheets

POWER STORAGE DEVICE, AND METHOD FOR MANUFACTURING POWER STORAGE DEVICE

This is a 371 national phase application of PCT/IB2007/002425 filed 23 Aug. 2007, claiming priority to Japanese Patent Application No. 2006-229357 filed 25 Aug. 2006, the contents of which are incorporated herein by reference.

BACKGROUND OF THE INVENTION

1. Field of the Invention

The invention relates to a power storage device having positive electrodes and negative electrodes stacked on top of each other with electrolytes interposed in-between and to a method for manufacturing such a power storage device.

2. Description of the Related Art

In recent years, as the large-capacity batteries used for electric vehicles and so on, various secondary batteries having a high energy density and a high output power density have been developed. As one of such secondary batteries, a bipolar type battery that uses bipolar electrodes as it electrodes is known.

A bipolar type battery is constituted of bipolar electrodes stacked on top of each other with electrolytes interposed in-between. Each bipolar electrode has a current collector, a positive electrode formed on one side of the current collector, and a negative electrode formed on the other side of the current collector. In order to prevent positional errors of the components of the stack of such a bipolar type battery, a method is used in which position markings are made at the components of the stack, such as electrodes, and the components are then stacked up by referring to the position markings.

Japanese Patent Application JP-A-2001-102050 describes an electrode structure of a stack-based battery/capacitor, in which positive electrode plates and negative electrode plates are stacked with insulative separators interposed in-between, as shown in FIG. 4. More specifically, referring to FIG. 4, a stack-based battery/capacitor described in this publication has separators 122a, 122b, and positioning portions 124a and 124b, or positioning portions 126a and 126b, are formed at the separators 122a, 122b. The positioning portions 124a, 124b, 126a, and 126b are in contact with corresponding side portions of positive electrodes 100 and negative electrodes 116.

According to such a method in which components are stacked by referring to markings, however, the components of the stack may be displaced from their positions when external force acts on the components in the direction perpendicular to the axis of the stack, and therefore the dimensional accuracy of the stack may become insufficient. Further, according to the method described in Japanese Patent Application JP-A-2001-102050, the positive electrode plates 100 and the negative electrode plates 110 may bend when they come into contact with the positioning portions 124, 124b, 126a, and 126b due to the external force acting in the direction perpendicular to the axis of the stack. In particular, if this structure is used for a bipolar type battery, because the stack components, such as current collectors, have a relatively small thickness and thus a relatively low strength, problems, such as bending of the components, may easily occur, and therefore the positioning accuracy may deteriorate.

U.S. Pat. No. 5,047,301 discloses a battery capable of extended operation at high temperature which battery includes a cell of laminated construction utilizing a solid oxidant cathode, an electrolyte element, a catalyst and a gas impermeable separator sheet providing an anode for the cell, with each element in electrical connection with the next. The solid oxidant is a mixture including powdered manganese dioxide, carbon and caustic material, the electrolyte element is a mixture including powdered magnesium oxide, and a binder, pressed into a solid pellet and soaked with caustic material. The cell further has a porous carbon paper substrate in electrical contact with the gas impermeable separator sheet and the catalyst is platinum dispersed on and adhered to the substrate. A source of hydrogen gas is provided, and when the battery is exposed to the hydrogen gas, a voltage is generated.

SUMMARY OF THE INVENTION

It is an object of the invention to provide a power storage device that achieves a high positioning accuracy and prevents displacement of stack components and a method for manufacturing such a power storage device.

In order to achieve this object, a power storage device according to a first aspect of the invention includes: a stack having positive electrodes and negative electrodes stacked on top of each other with electrolytes interposed in-between and in which a positioning hole is formed such that the positioning hole penetrates the stack in a stacking direction in which the positive electrodes, the negative electrodes, and the electrodes are stacked; a positioning member that is inserted into the positioning hole; and a terminal portion that is formed at an end of the positioning member in an inserting direction in which the positioning member is inserted into the positioning hole.

The power storage device according to the first aspect of the invention may be such that the terminal portion is provided in plurality, which include a positive electrode terminal and a negative electrode terminal that are provided at both ends of the positioning member in the inserting direction, respectively.

Further, the power storage device according to the first aspect of the invention may be such that the positioning member is made of an insulating material.

Further, the power storage device according to the first aspect of the invention may be such that the positioning hole is formed at substantially the center of the stack as viewed in the stacking direction of the stack.

Further, the power storage device according to the first aspect of the invention may be such that the positioning hole has a circular cross section.

Further, the power storage device according to the first aspect of the invention may be such that the positioning hole has a polygonal cross section.

Further, the power storage device according to the first aspect of the invention may be such that the positioning member has a polygonal cross section and edges of the positioning member are chamfered.

Further, for extracting electric current from the stack, the power storage device according to the first aspect of the invention may be such that: the terminal portion is provided with an electric wire that is connected to the positive electrode or the negative electrode of the stack; and the terminal portion is a conductive layer that covers an end portion of the positioning member in the inserting direction and extends to one of the positive electrode and the negative electrode that are provided at ends of the stack in the stacking direction so that a surface of the conductive layer contacts a surface of the one of the positive electrode and the negative electrode.

Further, the power storage device according to the first aspect of the invention may be such that the stack and a portion of the conductive layer are sealed by an insulator.

Further, the power storage device according to the first aspect of the invention may be such that each of the electrolytes of the stack contains a binder.

Further, the power storage device according to the first aspect of the invention may be such that the positive electrodes, the negative electrodes, and the electrolytes of the stack are coaxial with each other about the positioning member.

Further, the power storage device according to the first aspect of the invention may be such that the diameter of the electrolyte is larger than the diameter of the positive electrode and the diameter of the negative electrode.

Further, the power storage device according to the first aspect of the invention may be such that an insulating ring, which is a ring-shaped insulating member, is fit on the terminal portion of the positioning member and an exterior part of the power storage device is attached via the insulating ring.

A method according to a second aspect of the invention is a method for manufacturing a power storage device that has components constituting a stack, each component having a positioning hole, into which a positioning member is to be inserted, the method characterized by comprising, which includes: fitting a lowermost current collector, which has only a negative electrode provided on one side of the lowermost current collector, to the positioning member; fitting current collectors and electrolytes alternately to the positioning member so that the current collectors and the electrolytes are stacked up on the side of the negative electrode of the lowermost current collector, each of the current collectors having a positive electrode provided on one side of the current collector and a negative electrode provided on the other side of the current collector; fitting an uppermost current collector, which has only a positive electrode provided on one side of the uppermost current collector, to the positioning member from the side of the positive electrode so that the positive electrode is placed on the electrolyte; connecting the uppermost current collector and the positive electrode terminal; and connecting the lowermost current collector and the negative electrode terminal.

The method according to the second aspect of the invention may be such that the stack is sealed by an insulator such that only the uppermost current collector and the lowermost current collector are exposed.

Further, the method according to the second aspect of the invention may be such that the insulator is made of resin material.

Further, the method according to the second aspect of the invention may be such that an insulation treatment is applied to a portion of the positioning member that contacts the stack.

According to the invention, because the positioning hole is formed in the stack and the positioning member is inserted into the positioning hole, it is possible to prevent displacement of the positive electrodes, the negative electrodes, and the electrolytes, which may otherwise be caused by the external force acting in the direction perpendicular to the axis of the stack. Further, because the terminal portions (positive electrode terminal and negative electrode terminal) are provided at both ends of the positioning member, respectively, electric current can be extracted easily.

In addition, if the positioning member is made of an insulating material, it is possible to prevent short circuits between the positive electrodes, the negative electrodes, the electrolytes, and the positioning member, and other similar problems.

In addition, if the positioning hole is formed at substantially the center of the stack as viewed in the stacking direction of the stack, the stack can evenly receive the external force acting on the stack in the direction perpendicular to the axis of the stack.

In addition, if the terminal portions are formed by conductive layers contacting the positive electrode and the negative electrode of the stack, respectively, the area of contact between each terminal portion and the corresponding electrode is relatively large, which provides a larger output of the power storage device.

In addition, if a binder are contained in the electrolyte, it increases the strength of the electrolyte and thus increases the strength of the entire stack.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EXEMPLARY EMBODIMENTS

Hereinafter, exemplary embodiments of the invention will be described.

First Exemplary Embodiment

First, a power storage device according to the first exemplary embodiment of the invention will be described with reference to FIG. 1A and FIG. 1B. The power storage device of the first exemplary embodiment is a bipolar type battery having a cylindrical shape.

Figure 1A:
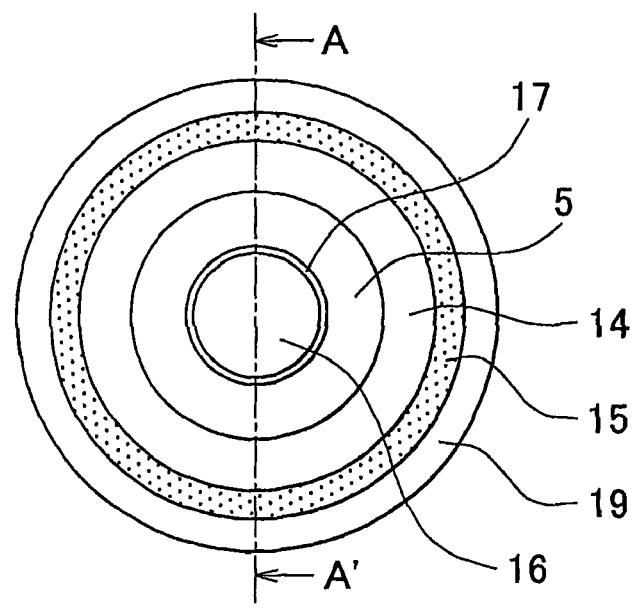
FIG. 1A is a cross sectional view showing a cross section that cuts through a current collector of a bipolar type battery of the first exemplary embodiment of the invention in the direction perpendicular to the axis of the bipolar type battery.
Figure 1B:
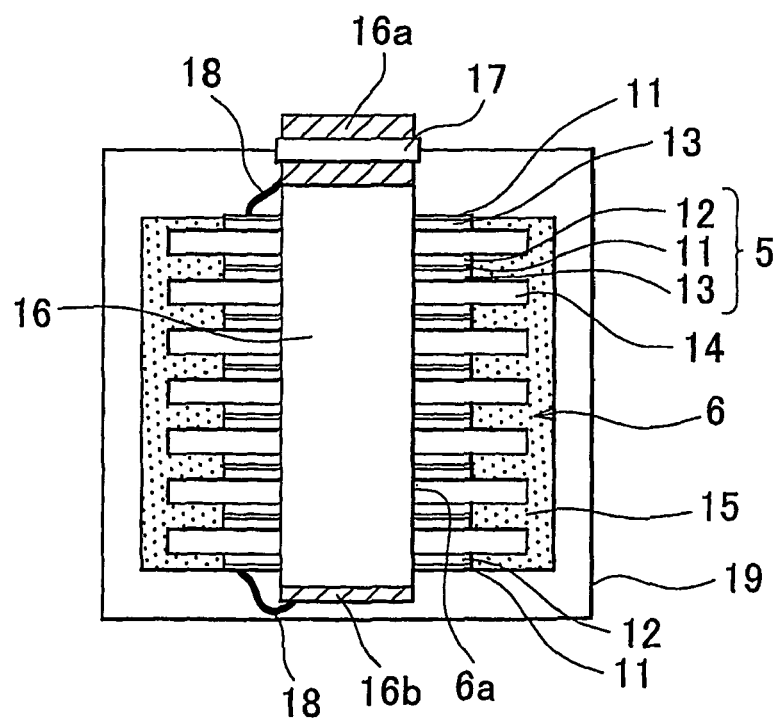
FIG. 1B is a cross-sectional view showing a cross section taken along A-A' indicated in FIG. 1A.

FIG. 1A and FIG. 1B are cross-sectional views of the bipolar type battery of the first exemplary embodiment. Specifically, FIG. 1A shows a cross section that cuts through a current collector of the bipolar type battery in the direction perpendicular to the axis of the bipolar type battery, and FIG. 1B shows a cross section that cuts through the bipolar type battery along A-A' indicated in FIG. 1A. The outline of the structure of the bipolar type battery of the first exemplary embodiment is as follows. In the first exemplary embodiment, the bipolar type battery is constituted of a plurality of bipolar electrodes 5 that stacked on top of each other with solid electrolyte layers 14 interposed in-between. Each bipolar electrode 5 has a current collector 11, a positive electrode layer 13 formed on one side of the current collector 11, and a negative electrode layer 12 formed on the other side of the current collector 11. Note that the current collector 11 at the top of a stack 6 (will be referred to "uppermost current collector 11") has the positive electrode layer 13 only, and the current collector 11 at the bottom of the stack 6 (will be referred to as "lowermost current collector 11") has the negative electrode layer 12 only.

The stack 6 is sealed by an insulating resin 15 such that only the uppermost and lowermost current collectors 11 are exposed from the insulating resin 15. A positioning hole 6a having a circular cross section is formed substantially at the center of the stack 6, such that the positioning hole 6a penetrates the stack 6 in the direction in which the components of the stack 6 are stacked (will be simply referred to as "stacking direction"). A cylindrical positioning member 16 is inserted into the positioning hole 6a.

The positioning member 16 is made of an insulating material. The upper end portion of the positioning member 16 is coated with metal, whereby a positive electrode terminal 16a is formed. Likewise, the lower end portion of the positioning member 16 is coated with metal, whereby a negative electrode terminal 16b is formed. The positive electrode terminal 16a is located above the stack 6, and the negative electrode terminal 16b is located below the stack 6.

An electric wire 18 is connected at one end to the positive electrode terminal 16a and at the other end to the uppermost current collector 11, whereby the positive electrode terminal 16a is indirectly connected to the positive electrode layer 13 formed on the uppermost current collector 11. Another electric wire 18 is connected at one end to the negative electrode terminal 16b and at the other end to the lowermost current collector 11, whereby the negative electrode terminal 16b is indirectly connected to the negative electrode layer 12 formed on the lowermost current collector 11.

An insulation ring 17, which is a ring-shaped insulating member, is press-fit to the portion of the positioning member 16 where the positive electrode terminal 16a is formed. A battery exterior part 19 is attached to the stack 6 via the insulating ring 17. As shown in FIG. 1A, the bipolar electrodes 5, the solid electrolyte layers 14, the insulating resin 15, and the battery exterior part 19 are arranged to be coaxial with each other about the positioning member 16. The diameter of each solid electrolyte layer 14 is larger than the diameter of each bipolar electrode 5. The diameter of the insulating resin 15 is larger than the diameter of each solid electrolyte layer 14. The diameter of the battery exterior part 19 is larger than the diameter of the insulating resin 15.

According to the above-described structure, the external force acting in the direction perpendicular to the stacking direction is received by the positioning member 16 extending through the center of the stack 6. Therefore, the respective components of the stack 6 (i.e., the bipolar electrodes 5, the solid electrolyte layers 14, etc.) can be accurately set in their positions, and further they can be reliably prevented from being displaced in the direction perpendicular to the stacking direction. Moreover, because the positive electrode terminal 16a and the negative electrode terminal 16b are formed at the ends of the positioning member 16 extending through the center of each current collector 11, the electric wires 18 can be easily connected.

Next, a method for manufacturing the bipolar type battery of the first exemplary embodiment will be described.

First, the positioning member 16 is put on a metal plate, which is not shown, using a jig. Here, it is assumed that the positioning hole 6a is formed in each component into which the positioning member 16 is to be inserted. Each positioning hole 6a is formed as follows. A hole is first made in a work using a press mold, which is not shown, and the burrs at the edges of the hole are then removed using etching liquid (e.g., nitric acid, ferric chloride, cupric chloride) and then the work is washed using pure water. For example, this method may be implemented as follows. A work is masked beforehand except the portion where a positioning hole 6a is to be formed, and the masking is removed after the etching by the etching liquid, and the work is then washed using pure water.

Next, the current collector 11 having only the negative electrode layer 12 on one side thereof (i.e., the lowermost current collector 11) is fit to the positioning member 16 such that the negative electrode layer 12 thereof faces above. Then, one of the electrode layers 14 is fit to the positioning member 16. Then, one of the bipolar electrodes 5 is fit to the positioning member 16 such that the positive electrode layer 13 thereof faces below. Then, other electrode layers 14 and bipolar electrodes 5 are alternatively fit to the positioning member 16 in the same manner, so that they are stacked on top of each other. At this time, the electrode layers 14 and the bipolar electrodes 5 are stacked such that one of the electrode layers 14 is at the top of the stack 6. Then, the current collector 11 having only the positive electrode layer 13 on one side thereof (i.e., the uppermost current collector 11) is fit to the positioning member 16 such that the positive electrode layer 13 thereof faces below. That is, the uppermost current collector 11 is placed on the electrode layer 14 at the top of the stack 6. Then, one of the electric wires 18 is connected between the uppermost current collector 11 and the positive electrode terminal 16a of the positioning member 16. Likewise, the other of the electric wires 18 is connected between the lowermost current collector 11 and the negative electrode terminal 16b of the positioning member 16. Finally, the stack 6 is sealed by the insulating resin 15, and then the battery exterior part 19 is attached.

The positioning member 16 is made of an insulating material. Therefore, even if the positioning member 16 comes into contact with the stack 6, problems, such as short circuits, do not occur. Thus, it is sufficient to apply insulation treatment to at least the portion of the positioning member 16 that contacts the stack 6. Meanwhile, the positioning member 16 may be made of a non-insulating material, In this case, for example, insulation treatment is applied to or insulating sheet is wrapped around the outer face of the positioning member 16 (the portion that contacts the stack 6). According to this structure, the material for the positioning member 16 can be selected from a wider variety of materials, which is advantageous to reduce the cost and the weight of the product.

Each current collector 11 is, for example, aluminum foil, stainless foil, or copper foil. The positive electrode active material for forming the positive electrode layer 13 on one side of each current collector 11 is, for example, spinel $LiMn_2O_4$, or composite oxide of transition metal and lithium, which is generally used for solution-based lithium ion batteries. More specifically, examples of the positive electrode active material for the positive electrode layer 13 include Li.Co based composite oxide (e.g., $LiCoO_2$), Li.Ni based composite oxide (e.g., $LiNiO_2$), Li.Mn based composite oxides (e.g., $LiMn_2O_4$), and Li.Fe based composite oxide (e.g., $LiFeO_2$). Further, phosphate compound and sulfated compound of transition metal and lithium (e.g., $LiFePO_4$), transition metal oxide and sulfide (e.g., $V_2O_5$, $MnO_2$, $TiS_2$, $MoS_2$, $MoO_3$), and $PbO_2$, $AgO$, $NiOOH$ may also be used as the positive electrode active material for the positive electrode layer 13.

The negative electrode active material for forming the negative electrode layer 12 on the other side of each current collector 11 is, for example, transition metal oxide, composite oxide of transition metal and lithium, titanium oxide, or composite oxide of titanium and lithium. The positive electrode active material and the negative electrode active material are applied to the surface of each current collector 11 using the inc-jet method, the spray printing method, the electrostatic spraying method, the spattering method, or the like. Note that binders (e.g., polymer solid electrolyte comprising polymers containing lithium salt and polar group) may be contained in each negative electrode layer 12 and each positive electrode layer 13.

The ion-conductive material for forming each solid electrolyte layer 14 is, for example, polyethylene oxide or polypropylene. The ion-conductive material, which is powdered, contains viscous binders. Examples of the viscous binders are polyvinyl alcohol (PVA), methyl cellulose, nitrocellulose, ethyl cellulose, poly vinyl butyral, vinyl acetate, polystyrene and copolymer, ethylene-vinyl acetate copolymer, polyethylene oxide, polyacrylate, wheat starch, alginic acid soda, wax emulsion, ester acrylate emulsion, and polyethylene glycol.

The ion-conductive material containing the viscous binders is first agitated and then pressed, using a pressing machine (not shown in the drawings), into a sheet-shaped solid electrolyte layer 14 having the positioning hole 6a. Owing to the viscous binders contained in the ion-conductive material, the strength of each solid electrolyte layer 14 is high, and therefore the solid electrolyte layers 14 do not deform when and after the positioning member 16 is inserted through them. Note that the viscous binders may be omitted if the solid electrolyte layers 14 are formed using the vacuum evaporation method.

The electric wires 18 may be attached by wire bonding, welding, etc.

Second Exemplary Embodiment

Figure 2A:
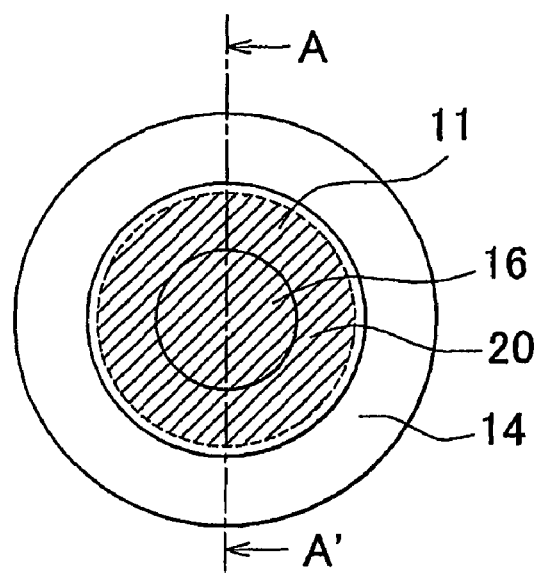
FIG. 2A is a cross sectional view showing a cross section that cuts through a current collector of a bipolar type battery of the second exemplary embodiment of the invention, which incorporates a structure for extracting electric current that is different from that incorporated in the bipolar type battery of the first exemplary embodiment.
Figure 2B:
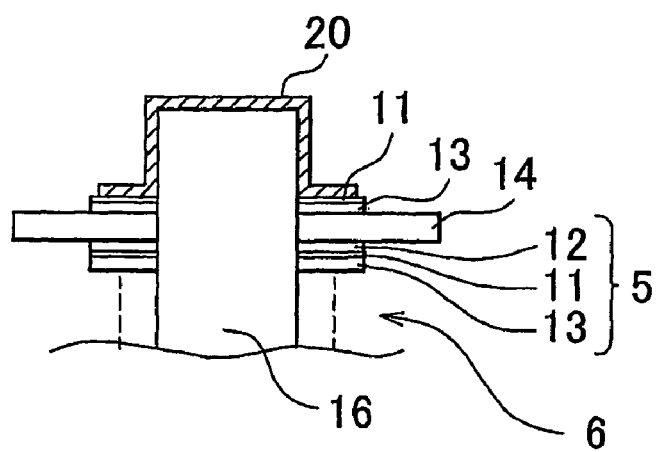
FIG. 2B is a cross-sectional view showing a cross section taken along A-A' indicated in FIG. 2A.

While the electric wires 18 are used to extract electric current in the first exemplary embodiment, the structure shown in FIG. 2A and FIG. 2B is employed to extract electric current in the second exemplary embodiment. FIG. 2A and FIG. 2B are cross-sectional views of a bipolar type battery according to the second exemplary embodiment, which is different from the one shown in FIG. 1A and FIG. 1B. Specifically, FIG. 2A shows a cross section that cuts through a current collector of the bipolar type battery in the direction perpendicular to the axis of the bipolar type battery, and FIG. 2B shows a cross section that cuts through the bipolar type battery along A-A' indicated in FIG. 2A. Note that the cross-sectional view of the FIG. 2B shows the portion near the positioning member 16 only.

In the second exemplary embodiment, too, the positioning member 16 is made of an insulating material. Hatched in FIG. 2A and FIG. 2B is a conductive layer 20 that servers as a positive electrode terminal. The conductive layer 20 is formed on the upper end portion of the positioning member 16 and the uppermost current collector 11. That is, the conductive layer 20 covers the top and outer faces of the upper end portion of the positioning member 16 and extends to the uppermost current collector 11. That is, the conductive layer 20 extends to the positive electrode layer 13 formed on the uppermost current collector 11 such that a surface of the conductive layer 20 and a surface of the positive electrode layer 13 indirectly contact each other. The conductive layer 20 is formed by, for example, applying metal plating to or attaching a hat-shaped metal foil to the top and outer faces of the upper end portion of the positioning member 16 and the uppermost current collector 11.

Likewise, another conductive layer 20, which servers as a negative electrode terminal, is formed on the top and outer faces of the lower end portion of the positioning member 16 and the lowermost current collector 11. When the conductive layers 20 are used to extract electric current as described above, the contact area with each current collector 11 is larger than it is when the electric wires 18 are used, and therefore the output of the bipolar type battery increases accordingly.

Also, when hat-shaped metal foils are used as the conductive layers 20, it is unnecessary to apply plating to the surfaces of the positioning member 16 to form the terminals, and therefore the production process is simplified. Further, the battery exterior part 19 may be omitted by sealing the stack 6 and part of each conductive layer 20 by the insulating resin 15 after forming each conductive layer 20. In this case, the production process is simplified, and the production cost of bipolar type batteries decreases.

While the invention has been applied to a bipolar type battery in the second exemplary embodiment, the invention may be applied also to stack-based secondary batteries (power storage devices) which are not of the bipolar type. Examples of such non-bipolar type batteries include those with current collectors each made of two different metals and having a positive electrode layer formed on one side and a negative electrode layer formed on the other side. For example, the invention may be applied to a lithium ion battery that has electrodes each having a positive electrode layer formed on an aluminum metal and a negative electrode layer formed on a copper.

Further, the invention may be applied to, as a stack-based power storage device, an electric double-layer capacitor constituted of a plurality of positive electrodes and negative electrodes that are alternately stacked on top of each other with separators interposed in-between. In this case, for example, current collector are formed by aluminum foils, activated carbon is used as positive and negative electrode active materials, and separators are formed by porous membranes made of polyethylene.

Third Exemplary Embodiment

Figure 3A:
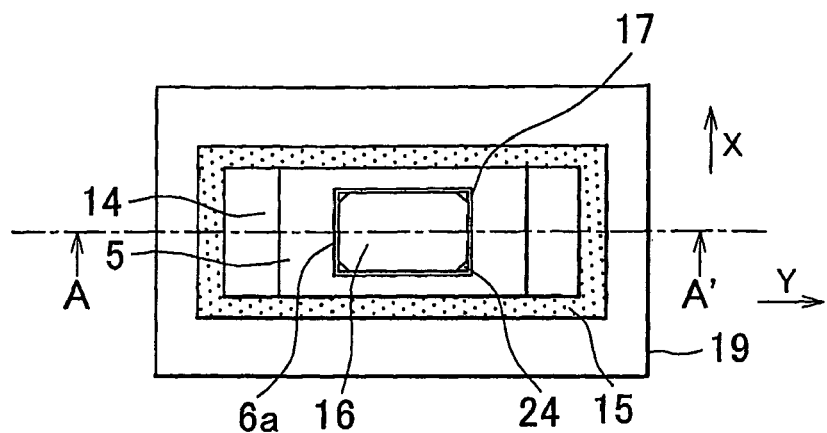
FIG. 3A is a cross sectional view showing a cross section that cuts through a current collector of a bipolar type battery of the third exemplary embodiment of the invention in the direction perpendicular to the axis of the bipolar type battery.
Figure 3B:
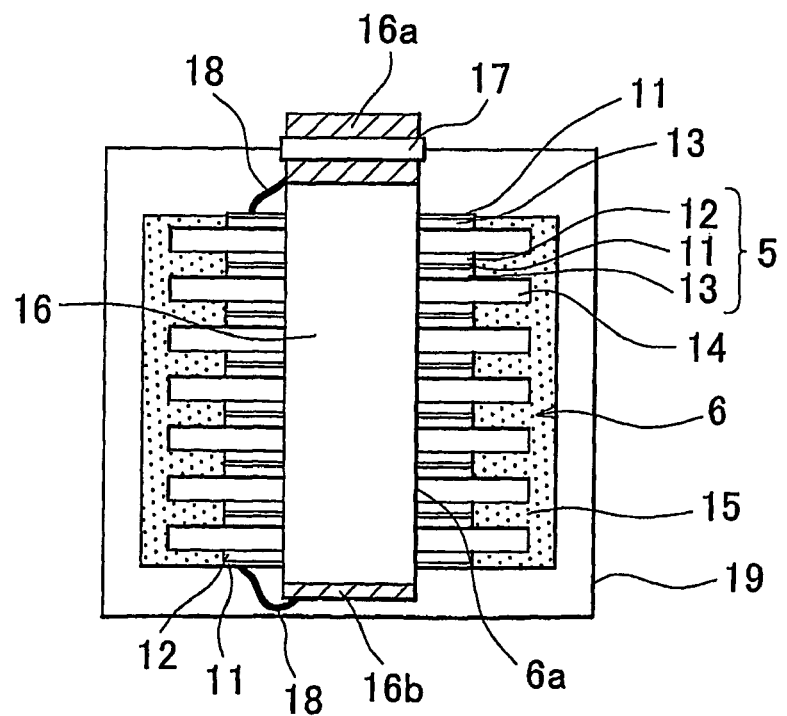
FIG. 3B is a cross-sectional view showing a cross section taken along A-A' indicated in FIG. 3A.
Figure 4:
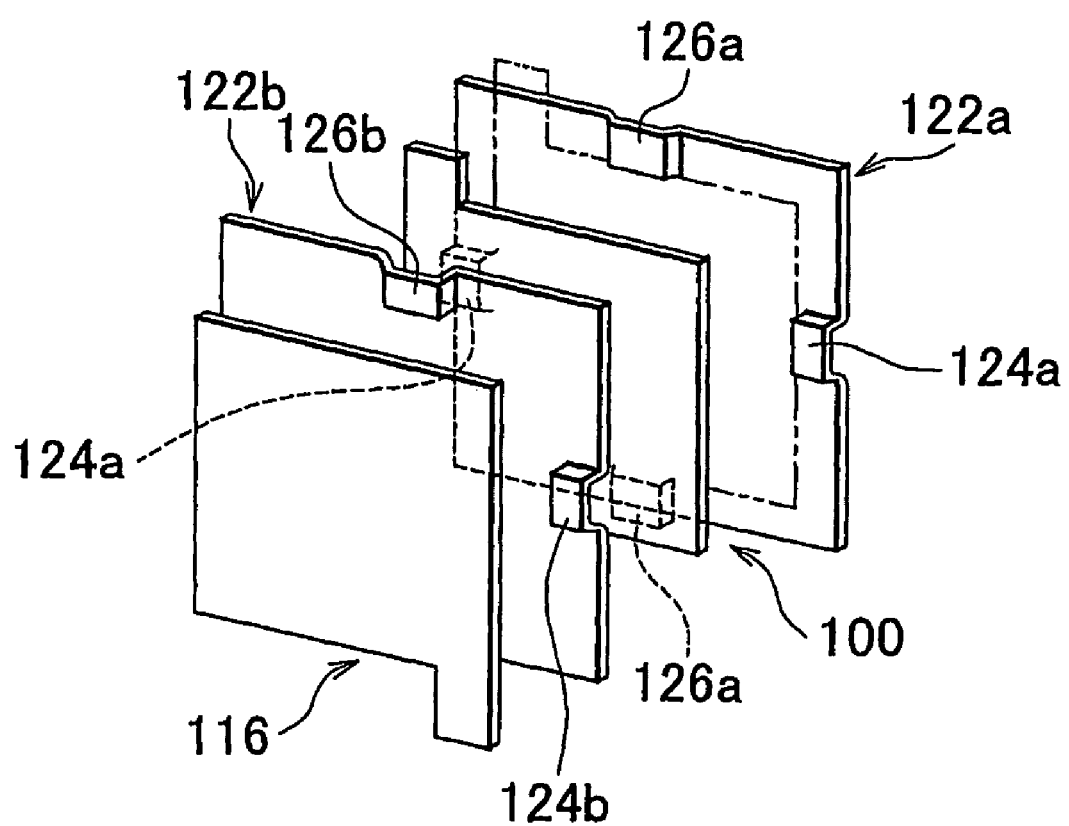
FIG. 4 is a perspective view showing a related art stack-based battery/capacitor.

FIG. 3A and FIG. 3B are cross-sectional views showing a bipolar type battery according to the third exemplary embodiment of the invention. Specifically, FIG. 3A shows a cross section that cuts through a current collector of the bipolar type battery in the direction perpendicular to the axis of the axis of the bipolar type battery, and FIG. 3B shows a cross section that cuts through the bipolar type battery along A-A' indicated in FIG. 3A. The bipolar type battery of the third exemplary embodiment is a square battery. The positioning member 16 is formed in a square shape, and each edge of the positioning member 16 is rounded by chamfering. Chamfering the edges of the positioning member 16 prevents damages on the stack 6 that may otherwise be caused when the edges of the positioning member 16 contact the stack 6.

The current collectors 11 and the solid electrolyte layers 14 are formed in a rectangular shape. The dimension of each current collector 11 in the direction X in FIG. 3A and the dimension of each solid electrolyte layer 14 in the same direction are equal to each other. On the other hand, the dimension of each solid electrolyte layer 14 in the direction Y in FIG. 3A is longer than the dimension of each current collector 11 in the same direction. The stack 6 is sealed by the insulating resin 15 such that only the current collectors 11 at the top and bottom of the stack 6 are exposed from the insulating resin 15. A positioning hole 6a having a rectangular cross section is formed substantially at the center of the stack 6, such that the positioning hole 6a penetrates the stack 6 in the stacking direction. When the positioning member 16 is in the positioning hole 6a, there are gaps 24 between the positioning hole 6a and the rounded edges of the positioning member 16.

Meanwhile, the cross section of the positioning hole 6a may alternatively be formed in a polygonal shape other than a rectangular shape. Forming the cross section of the positioning hole 6a in a polygonal shape prevents displacement of the stack 6 that may otherwise be caused when the stack 6 rotates. Other structures of the bipolar type battery of the third exemplary embodiment are the same as those of the bipolar type battery of the first exemplary embodiment, and therefore their descriptions are omitted As such, the bipolar type battery of the third exemplary embodiment provides, as well as the advantages descried above, the same advantages as those obtained with the bipolar type battery of the first exemplary embodiment. The structure of the bipolar type battery of the second exemplary embodiment, which is a modification example of the bipolar type battery of the first exemplary embodiment, may be incorporated also in the bipolar type battery of the third exemplary embodiment.

The secondary batteries and capacitors recited in the foregoing exemplary embodiments may be used as, for example, power storage devices for powering electric motors of electric vehicles (EV), hybrid vehicles (HEV), and fuel cell vehicles (FCV).

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the scope of the invention.

The invention claimed is:

1. A power storage device, comprising:
a stack having positive electrodes and negative electrodes stacked on top of each other with electrolytes interposed in-between and in which a positioning hole is formed, the positioning hole penetrating the stack in a stacking direction in which the positive electrodes, the negative electrodes, and the electrolytes are stacked;
a positioning member that is inserted into the positioning hole; and
a terminal portion that is formed at an end of the positioning member in an inserting direction in which the positioning member is inserted into the positioning hole, wherein
the terminal portion is provided with an electric wire, the terminal portion indirectly contacting a surface of one of the positive electrode or the negative electrode of the stack.

2. The power storage device according to claim 1, wherein the terminal portion is provided in plurality, which include a positive electrode terminal and a negative electrode terminal that are provided at both ends of the positioning member in the inserting direction, respectively.

3. The power storage device according to claim 1, wherein the positioning member is made of an insulating material.

4. The power storage device according to claim 1, wherein the positioning hole is formed at substantially the center of the stack as viewed in the stacking direction of the stack.

5. The power storage device according to claim 4, wherein the positioning hole has a circular cross section.

6. The power storage device according to claim 4, wherein the positioning hole has a polygonal cross section.

7. The power storage device according to claim 6, wherein the positioning member has a polygonal cross section and edges of the positioning member are chamfered.

8. The power storage device according to claim 1, wherein each of the electrolytes of the stack contains a binder.

9. The power storage device according to claim 1, wherein the positive electrodes, the negative electrodes, and the electrolytes of the stack are coaxial with each other about the positioning member.

10. The power storage device according to claim 9, wherein the diameter of the electrolyte is larger than the diameter of the positive electrode and the diameter of the negative electrode.

11. The power storage device according to claim 1, wherein an insulating ring, which is a ring-shaped insulating member, is fit on the terminal portion of the positioning member, and
an exterior part of the power storage device is attached via the insulating ring.

12. A power storage device comprising:
a stack having positive electrodes and negative electrodes stacked on top of each other with electrolytes interposed in-between and in which a positioning hole is formed, the positioning hole penetrating the stack in a stacking direction in which the positive electrodes, the negative electrodes, and the electrolytes are stacked;
a positioning member that is inserted into the positioning hole; and
a terminal portion that is formed at an end of the positioning member in an inserting direction in which the positioning member is inserted into the positioning hole, wherein
the terminal portion is a conductive layer that covers the end of the positioning member in the inserting direction and extends to a current collector contacting one of the positive electrode and the negative electrode that are provided at ends of the stack in the stacking direction such that a surface of the conductive layer indirectly contacts a surface of the one of the positive electrode or the negative electrode.

13. The power storage device according to claim 12, wherein
the stack and a portion of the conductive layer are sealed by an insulator.

14. The power storage device according to claim 12, wherein
the terminal portion is provided in plurality, which include a positive electrode terminal and a negative electrode terminal that are provided at both ends of the positioning member in the inserting direction, respectively.

15. The power storage device according to claim 12, wherein
the positioning member is made of an insulating material.

16. The power storage device according to claim 12, wherein
the positioning hole is formed at substantially the center of the stack as viewed in the stacking direction of the stack.

17. The power storage device according to claim 16, wherein
the positioning hole has a circular cross-section.

18. The power storage device according to claim 16, wherein
the positioning hole has a polygonal cross-section.

19. The power storage device according to claim 18, wherein
the positioning member has a polygonal cross-section and edges of the positioning member are chamfered.

20. The power storage device according to claim 12, wherein
each of the electrolytes of the stack contains a binder.

21. The power storage device according to claim 12, wherein
the positive electrodes, the negative electrodes, and the electrolytes of the stack are coaxial with each other about the positioning member.

22. The power storage device according to claim 21, wherein
the diameter of the electrolyte is larger than the diameter of the positive electrode and the diameter of the negative electrode.

23. The power storage device according to claim 12, wherein
an insulating ring, which is a ring-shaped insulating member, is fit on the terminal portion of the positioning member, and
an exterior part of the power storage device is attached via the insulating ring.

* * * * *